US012209668B2

(12) United States Patent
Imura et al.

(10) Patent No.: US 12,209,668 B2
(45) Date of Patent: Jan. 28, 2025

(54) SLIDING COMPONENT

(71) Applicant: Eagle Industry Co., Ltd., Tokyo (JP)

(72) Inventors: Tadatsugu Imura, Tokyo (JP); Hiroshi Suzuki, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 272 days.

(21) Appl. No.: 17/425,277

(22) PCT Filed: Jan. 31, 2020

(86) PCT No.: PCT/JP2020/003645
§ 371 (c)(1),
(2) Date: Jul. 22, 2021

(87) PCT Pub. No.: WO2020/162349
PCT Pub. Date: Aug. 13, 2020

(65) Prior Publication Data
US 2022/0099188 A1 Mar. 31, 2022

(30) Foreign Application Priority Data
Feb. 4, 2019 (JP) .................................. 2019-017873

(51) Int. Cl.
*F16J 15/34* (2006.01)
*F16C 17/04* (2006.01)
(Continued)

(52) U.S. Cl.
CPC ........... *F16J 15/3412* (2013.01); *F16C 17/04* (2013.01); *F16C 33/106* (2013.01); *F16C 33/74* (2013.01); *F16C 2361/43* (2013.01)

(58) Field of Classification Search
CPC .................................................. F16J 15/3412
See application file for complete search history.

(56) References Cited

U.S. PATENT DOCUMENTS 3,383,116 A 5/1968 Carter .............................. 277/96
3,527,465 A 9/1970 Guinard
(Continued)

FOREIGN PATENT DOCUMENTS

| CN | 1245552 | 2/2000 | ............... F16J 15/34 |
| CN | 2460801 | 11/2001 | ............... F16J 15/40 |

(Continued)

OTHER PUBLICATIONS

U.S. Appl. No. 16/959,105, filed Jun. 29, 2020, Imura.
(Continued)

*Primary Examiner* — Vishal A Patel
(74) *Attorney, Agent, or Firm* — HAYES SOLOWAY P.C.

(57) ABSTRACT

A sliding component having an annular shape is disposed at a relative rotation point of a rotating machine. A plurality of dynamic pressure generation mechanisms are provided on a sliding surface of the sliding component each including a first groove portion communicating with a leak side and a pair of second groove portions and communicating with the first groove portion and extending on both sides in a circumferential direction. Extension-direction end surfaces and of the second groove portions and are disposed on a sealing target fluid side as compared with a communication portions between the first groove portion and each of the second communication portions.

7 Claims, 11 Drawing Sheets

(51) Int. Cl.
*F16C 33/10* (2006.01)
*F16C 33/74* (2006.01)

(56) References Cited

U.S. PATENT DOCUMENTS

| | | | | |
|---|---|---|---|---|
| 3,675,935 | A | 7/1972 | Ludwig | F16J 15/342 |
| 3,695,789 | A | 10/1972 | Jansson | F01C 21/003 |
| 3,704,019 | A | 11/1972 | McHugh | 277/400 |
| 3,782,737 | A | 1/1974 | Ludwig et al. | 277/27 |
| 3,870,382 | A | 3/1975 | Reinhoudt | F16C 17/045 |
| 4,007,974 | A | 2/1977 | Huber | F16C 17/045 |
| 4,056,478 | A | 11/1977 | Capelli | C01M 5/00 |
| 4,071,253 | A | 1/1978 | Heinen et al. | 277/3 |
| 4,120,544 | A | 10/1978 | Huber | F16C 33/107 |
| 4,523,764 | A | 6/1985 | Albers et al. | 277/3 |
| 4,889,348 | A | 12/1989 | Amundson | 277/306 |
| 5,066,026 | A | 11/1991 | Heck | F16J 15/3412 |
| 5,071,141 | A | 12/1991 | Lai et al. | |
| 5,092,612 | A | 3/1992 | Victor et al. | 277/96.1 |
| 5,174,584 | A | 12/1992 | Lahrman | 277/400 |
| 5,180,173 | A | 1/1993 | Kimura et al. | |
| 5,222,743 | A | 6/1993 | Goldswain | F16J 15/3412 |
| 5,224,714 | A | 7/1993 | Kimura | 277/400 |
| 5,368,314 | A * | 11/1994 | Victor | F16J 15/3412 |
| | | | | 277/400 |
| 5,447,316 | A * | 9/1995 | Matsui | F16C 17/045 |
| | | | | 277/400 |
| 5,556,111 | A | 9/1996 | Sedy | 277/400 |
| 5,558,341 | A | 9/1996 | McNickle | 277/400 |
| 5,769,604 | A | 6/1998 | Gardner et al. | 415/170.1 |
| 5,834,094 | A | 11/1998 | Etsion et al. | 428/156 |
| 5,947,481 | A | 9/1999 | Young | 277/400 |
| 5,952,080 | A | 9/1999 | Etsion et al. | 428/156 |
| 6,002,100 | A | 12/1999 | Etsion | 219/121.71 |
| 6,046,430 | A | 4/2000 | Etsion | 219/121.71 |
| 6,135,458 | A | 10/2000 | Fuse | 277/401 |
| 6,152,452 | A | 11/2000 | Wang | 277/400 |
| 6,213,473 | B1 | 4/2001 | Lebeck | |
| 6,446,976 | B1 | 9/2002 | Key et al. | |
| 6,692,006 | B2 | 2/2004 | Holder | 277/346 |
| 6,726,213 | B2 | 4/2004 | Wang | 277/400 |
| 7,258,346 | B2 | 8/2007 | Tejima | 277/399 |
| 7,377,518 | B2 | 5/2008 | Lai | 277/400 |
| 7,744,094 | B2 | 6/2010 | Yanagisawa | F16J 15/342 |
| 7,758,051 | B2 | 7/2010 | Roberts-Haritonov | 277/401 |
| 7,931,277 | B2 | 4/2011 | Garrison | 277/399 |
| 8,100,405 | B2 | 1/2012 | Kneeland et al. | 277/355 |
| 8,342,534 | B2 | 1/2013 | Vasagar | 277/399 |
| 8,585,060 | B2 | 11/2013 | Oshii et al. | 277/401 |
| 8,757,632 | B2 | 6/2014 | Dobosz | F16J 15/3412 |
| 9,151,390 | B2 | 10/2015 | Hosoe | F16J 15/3412 |
| 9,169,931 | B2 | 10/2015 | Tokunaga | F16J 15/34 |
| 9,228,660 | B2 | 1/2016 | Hosoe | F16J 15/3412 |
| 9,347,566 | B2 | 5/2016 | Tokunaga | F16J 15/3412 |
| 9,353,865 | B2 | 5/2016 | Lattin | F16N 21/00 |
| 9,353,867 | B2 | 5/2016 | Itadani et al. | F16J 15/3448 |
| 9,494,239 | B2 | 11/2016 | Hosoe | F16J 15/342 |
| 9,512,923 | B2 | 12/2016 | Inoue et al. | F16J 15/34 |
| 9,574,667 | B2 | 2/2017 | Takahashi et al. | F16J 15/342 |
| 9,772,037 | B2 | 9/2017 | Itadani et al. | F16J 15/3412 |
| 9,784,372 | B2 | 10/2017 | Iguchi | F16J 15/342 |
| 9,863,473 | B2 | 1/2018 | Hosoe et al. | F16C 33/741 |
| 9,958,010 | B2 | 5/2018 | Itadani | F16C 33/74 |
| 9,982,715 | B2 | 5/2018 | Gorges et al. | F16C 33/201 |
| 10,054,230 | B2 | 8/2018 | Katori et al. | F16J 15/3412 |
| 10,132,411 | B2 | 11/2018 | Hosoe et al. | F16J 15/164 |
| 10,337,620 | B2 | 7/2019 | Tokunaga et al. | F16J 15/342 |
| 10,443,737 | B2 | 10/2019 | Itadani | F16J 15/342 |
| 10,495,228 | B2 | 12/2019 | Itadani | F16J 15/342 |
| 10,612,666 | B2 | 4/2020 | Tokunaga | F16J 15/36 |
| 10,823,162 | B2 | 11/2020 | Kume | F04B 27/1804 |
| 10,865,883 | B2 | 12/2020 | Seki et al. | F16J 15/3404 |
| 11,248,706 | B2 | 2/2022 | Imura | F16C 33/74 |
| 11,320,052 | B2 | 5/2022 | Imura et al. | F16J 15/34 |
| 11,708,911 | B2 | 7/2023 | Imura | F16J 15/34 |
| 2002/0014743 | A1 | 2/2002 | Zheng | 277/358 |
| 2002/0093141 | A1 | 7/2002 | Wang | F16J 15/34 |
| 2002/0109302 | A1 | 8/2002 | Muraki | F16J 15/3412 |
| 2002/0158416 | A1 | 10/2002 | Hosanna | F16J 15/3404 |
| 2004/0080112 | A1 | 4/2004 | Tejima | F16J 15/3436 |
| 2005/0212217 | A1 | 9/2005 | Tejima | 277/399 |
| 2005/0263963 | A1 | 12/2005 | Lai | 277/399 |
| 2007/0228664 | A1 | 10/2007 | Anand | F16J 15/3496 |
| 2007/0267820 | A1 | 11/2007 | Martin | F16J 15/3496 |
| 2007/0275267 | A1 | 11/2007 | Sabouni | F16J 15/3496 |
| 2007/0296156 | A1 | 12/2007 | Yanagisawa et al. | 277/352 |
| 2008/0100001 | A1 | 5/2008 | Flaherty | |
| 2009/0200749 | A1 | 8/2009 | Teshima | F16J 15/3484 |
| 2011/0215531 | A1 | 9/2011 | Tokunaga et al. | 277/399 |
| 2011/0215535 | A1 | 9/2011 | Vasagar | 277/559 |
| 2011/0305871 | A1 | 12/2011 | Tabuchi | F16J 15/3284 |
| 2012/0018957 | A1 | 1/2012 | Watanabe | F16J 15/34 |
| 2012/0217705 | A1 | 8/2012 | Hosoe | 277/400 |
| 2013/0168928 | A1 | 7/2013 | Schrufer | C10M 103/02 |
| 2013/0209011 | A1* | 8/2013 | Tokunaga | F16C 33/74 |
| | | | | 384/123 |
| 2014/0159314 | A1 | 6/2014 | Hosoe | F16J 15/34 |
| 2014/0197600 | A1 | 7/2014 | Hosoe | F16J 15/342 |
| 2014/0203517 | A1 | 7/2014 | Ferris | F16J 15/3412 |
| 2014/0217676 | A1 | 8/2014 | Hosoe et al. | 277/350 |
| 2014/0319776 | A1 | 10/2014 | Theike et al. | |
| 2015/0115537 | A1* | 4/2015 | Tokunaga | F16J 15/3412 |
| | | | | 277/348 |
| 2015/0115540 | A1 | 4/2015 | Tokunaga | F16J 15/34 |
| 2015/0123350 | A1 | 5/2015 | Itadani | F16J 15/3412 |
| 2015/0167847 | A1 | 6/2015 | Tokunaga | |
| 2015/0345642 | A1 | 12/2015 | Haas | F16J 15/3496 |
| 2015/0377297 | A1 | 12/2015 | Tokunaga et al. | F16C 33/748 |
| 2016/0033045 | A1 | 2/2016 | Itadani et al. | F16J 15/3412 |
| 2016/0097457 | A1 | 4/2016 | Sun et al. | F16J 15/3412 |
| 2017/0175726 | A1 | 6/2017 | Kume | F04B 27/1804 |
| 2017/0241549 | A1 | 8/2017 | Itadani | F16J 15/3412 |
| 2017/0261107 | A1 | 9/2017 | Martin | F16J 15/3452 |
| 2017/0350407 | A1 | 12/2017 | Yamamoto et al. | F04D 29/346 |
| 2018/0017163 | A1 | 1/2018 | Hosoe et al. | F16J 15/164 |
| 2018/0051809 | A1 | 2/2018 | Yoshida | F16J 15/3412 |
| 2018/0073394 | A1 | 3/2018 | Tokunaga et al. | F01D 25/18 |
| 2018/0112711 | A1 | 4/2018 | Itadani | F16J 15/363 |
| 2018/0128377 | A1 | 5/2018 | Tukunaga et al. | F16J 15/3412 |
| 2018/0128378 | A1 | 5/2018 | Tokunaga et al. | F16J 15/342 |
| 2018/0135699 | A1 | 5/2018 | Tokunaga et al. | F16C 33/80 |
| 2018/0172162 | A1 | 6/2018 | Tokunaga et al. | F16J 15/34 |
| 2018/0195618 | A1 | 7/2018 | Itadani et al. | F16J 15/3416 |
| 2018/0299015 | A1 | 10/2018 | Itadani | F16J 15/3448 |
| 2019/0170257 | A1 | 6/2019 | Hosoe et al. | F16J 15/3412 |
| 2019/0285115 | A1 | 9/2019 | Negishi et al. | F16C 14/045 |
| 2019/0301522 | A1 | 10/2019 | Negishi et al. | F16C 17/02 |
| 2019/0331162 | A1 | 10/2019 | Negishi | F16J 15/34 |
| 2020/0224768 | A1 | 7/2020 | Imura | F16J 15/3412 |
| 2020/0240470 | A1 | 7/2020 | Sorgenti | F16J 15/3212 |
| 2020/0332901 | A1 | 10/2020 | Imura | F16J 15/3412 |
| 2021/0041026 | A1 | 2/2021 | Imura | F16J 15/3424 |
| 2021/0048062 | A1 | 2/2021 | Masumi et al. | F16C 17/102 |
| 2021/0048106 | A1 | 2/2021 | Imura et al. | F16J 15/3412 |
| 2021/0080009 | A1 | 3/2021 | Kimura et al. | F16J 15/3412 |
| 2021/0116030 | A1 | 4/2021 | Kimura et al. | F16J 15/182 |
| 2021/0364034 | A1 | 11/2021 | Okada | F16J 15/342 |

FOREIGN PATENT DOCUMENTS

| | | | |
|---|---|---|---|
| CN | 1401924 | 3/2003 | F16J 15/16 |
| CN | 101644333 | 2/2010 | F16J 15/34 |
| CN | 201496542 | 6/2010 | F16J 15/16 |
| CN | 101793169 | 8/2010 | F01D 11/08 |
| CN | 101793324 | 8/2010 | F16J 15/16 |
| CN | 101861485 | 10/2010 | F16J 15/34 |
| CN | 203098871 | 7/2013 | F16J 15/34 |
| CN | 103557229 | 2/2014 | F16C 17/04 |
| CN | 103557334 | 2/2014 | F16J 15/34 |
| CN | 203641506 | 6/2014 | F16J 15/16 |
| CN | 104169622 | 11/2014 | F16J 15/34 |
| CN | 104321568 | 1/2015 | F16C 33/72 |
| CN | 104685273 | 6/2015 | F16J 15/34 |
| CN | 106029294 | 10/2016 | B23K 26/364 |

(56) References Cited

FOREIGN PATENT DOCUMENTS

| | | | |
|---|---|---|---|
| CN | 106439023 | 10/2016 | ............... F16J 15/16 |
| CN | 205877184 | 1/2017 | ............... F16J 15/16 |
| CN | 205877198 | 1/2017 | ............... F16J 15/34 |
| CN | 106763778 | 5/2017 | ............... F16J 15/16 |
| CN | 107489770 | 12/2017 | ............... F16J 15/34 |
| CN | 107906206 | 4/2018 | ............... F16J 15/34 |
| CN | 105014489 | 11/2018 | ............... B24B 19/02 |
| CN | 109237042 | 1/2019 | ............... F16J 15/34 |
| CN | 110770456 | 2/2020 | ............... F16C 33/12 |
| CN | 111656065 | 9/2020 | ............... F16J 15/34 |
| DE | 3223703 | 6/1982 | ............... F16J 15/34 |
| DE | 102008038396 | 2/2010 | |
| EP | 0369295 | 11/1988 | |
| EP | 0518681 | 12/1992 | ............... G11B 15/60 |
| EP | 0637706 | 8/1993 | ............... F16J 15/34 |
| EP | 2138225 | 12/2009 | ............... B01J 13/20 |
| EP | 2754931 | 7/2014 | ............... F16J 15/34 |
| EP | 3112078 | 1/2017 | ............ B23K 26/364 |
| EP | 3196516 | 7/2017 | ............... F16J 15/34 |
| EP | 3217049 | 9/2017 | ............... F16J 15/34 |
| EP | 3396186 | 10/2018 | ............... F16C 33/10 |
| EP | 33396185 | 10/2018 | ............... F16C 27/04 |
| EP | 3575621 | 12/2019 | ............... F16C 33/10 |
| EP | 3575643 | 12/2019 | ............... F16J 15/34 |
| EP | 3650722 | 5/2020 | ............... F16C 33/12 |
| FR | 2342440 | 9/1997 | ............... F16J 15/34 |
| GB | 1509482 | 5/1978 | ............... F16C 33/10 |
| GB | 2263952 | 8/1993 | ............... F16J 15/34 |
| JP | S51-034974 | 3/1976 | |
| JP | S52-143571 | 10/1977 | ............... F16J 15/26 |
| JP | 57163770 | 10/1982 | ............ F16J 15/3412 |
| JP | S59-195253 | 12/1984 | ............... F16J 15/34 |
| JP | S59-195254 | 12/1984 | ............... F16J 15/34 |
| JP | S63-190975 | 8/1988 | ............... F16J 15/34 |
| JP | H02-136863 | 11/1990 | ............... F16J 15/34 |
| JP | H04-50559 | 2/1992 | ............... F16J 15/34 |
| JP | H02-236067 | 9/1992 | ............... F16J 15/34 |
| JP | H04-337165 | 11/1992 | ............... F16J 15/34 |
| JP | H05-60247 | 3/1993 | ............... F16J 15/34 |
| JP | H05-296248 | 11/1993 | |
| JP | H05-90049 | 12/1993 | ............... F16J 15/34 |
| JP | H06-17941 | 1/1994 | ............... F16J 15/34 |
| JP | H06-117547 | 4/1994 | ............... F16J 15/34 |
| JP | H06-174107 | 6/1994 | ............... F16J 15/34 |
| JP | H06-323442 | 11/1994 | ............... F16J 15/34 |
| JP | H06-105105 | 12/1994 | ............... F16J 15/34 |
| JP | 9-89119 | 3/1997 | ............... F16J 15/34 |
| JP | 9-292034 | 11/1997 | ............... F16J 15/34 |
| JP | H10-281299 | 10/1998 | ............... F16J 15/34 |
| JP | H10-292867 | 11/1998 | |
| JP | H11-287329 | 10/1999 | ............... F16J 15/34 |
| JP | 3066367 | 5/2000 | ............... F16J 15/34 |
| JP | 2001-12458 | 1/2001 | ............... F16C 17/10 |
| JP | 2003-343730 | 12/2003 | ............... F16J 15/22 |
| JP | 2005-180652 | 7/2005 | ............... F16J 15/34 |
| JP | 2005-315391 | 11/2005 | |
| JP | 2005-337503 | 12/2005 | ............... F16J 15/34 |
| JP | 2006-77899 | 3/2006 | ............... F16J 15/34 |
| JP | 2006-90524 | 4/2006 | ............... F16C 17/02 |
| JP | 2006-183702 | 7/2006 | ............... F16C 17/04 |
| JP | 2007-162045 | 6/2007 | |
| JP | 2008-106940 | 5/2008 | ............... F16J 15/34 |
| JP | 2011-74931 | 4/2011 | ............... F16J 15/34 |
| JP | 2011-185292 | 9/2011 | ............... F16J 15/34 |
| JP | 2012-2295 | 1/2012 | ............... F16J 15/34 |
| JP | 2012002295 A * | 1/2012 | |
| JP | 2012-062534 | 3/2012 | |
| JP | 2012-122135 | 6/2012 | ............... C25D 15/02 |
| JP | 2013-213545 | 10/2013 | ............... F16C 32/06 |
| JP | 2014-529052 | 10/2014 | |
| JP | 2015-063647 | 4/2015 | ............... C08J 7/00 |
| JP | 2015-68330 | 4/2015 | ............... F04C 29/00 |
| JP | 5693599 | 4/2015 | |
| JP | 2016-80090 | 5/2016 | ............... F16J 15/34 |
| JP | 5960145 | 7/2016 | ............... F16J 15/34 |
| KR | 10-2017-0093349 | 8/2017 | ............... F04B 53/10 |
| WO | WO 2006/051702 | 5/2006 | ............... F16J 15/34 |
| WO | WO 2011/115073 | 9/2011 | ............... F16J 15/34 |
| WO | WO 2012/046749 | 4/2012 | ............... F16J 15/34 |
| WO | WO 2013/035503 | 3/2013 | ............... F16J 15/34 |
| WO | WO2013053411 | 4/2013 | |
| WO | WO2014061544 | 4/2014 | |
| WO | WO2014148316 | 9/2014 | ............... F16J 15/34 |
| WO | WO2014148317 | 9/2014 | ............... F16J 15/34 |
| WO | WO 2014/174725 | 10/2014 | ............... F16J 15/34 |
| WO | WO2015111707 | 7/2015 | ............... F16J 15/18 |
| WO | WO2016035860 | 3/2016 | ............... F16J 15/34 |
| WO | WO 2016/167262 | 10/2016 | ............... F16J 15/34 |
| WO | WO 2016/186015 | 11/2016 | ............... F16J 15/34 |
| WO | WO 2016/186019 | 11/2016 | ............... F16J 15/34 |
| WO | WO 2016/186020 | 11/2016 | ............... F16J 15/34 |
| WO | WO 2016/203878 | 12/2016 | ............... F16J 15/34 |
| WO | WO 2017/002774 | 1/2017 | ............... F16J 15/34 |
| WO | WO 2017/061406 | 4/2017 | ............... F16J 15/34 |
| WO | WO 2018/092742 | 5/2018 | ............... F16J 15/34 |
| WO | WO 2018/105505 | 6/2018 | ............... F16J 33/12 |
| WO | WO2018/139231 | 8/2018 | ............... F16J 15/34 |

OTHER PUBLICATIONS

U.S. Appl. No. 16/964,943, filed Jul. 24, 2020, Imura et al.
U.S. Appl. No. 17/424,847, filed Jul. 21, 2021, Hashimoto et al.
U.S. Appl. No. 17/424,850, filed Jul. 21, 2021, Ou et al.
U.S. Appl. No. 17/425,281, filed Jul. 22, 2021, Suzuki.
U.S. Appl. No. 17/425,678, filed Jul. 23, 2021, Suzuki et al.
U.S. Appl. No. 17/433,561, filed Aug. 24, 2021, Miyazaki et al.

* cited by examiner

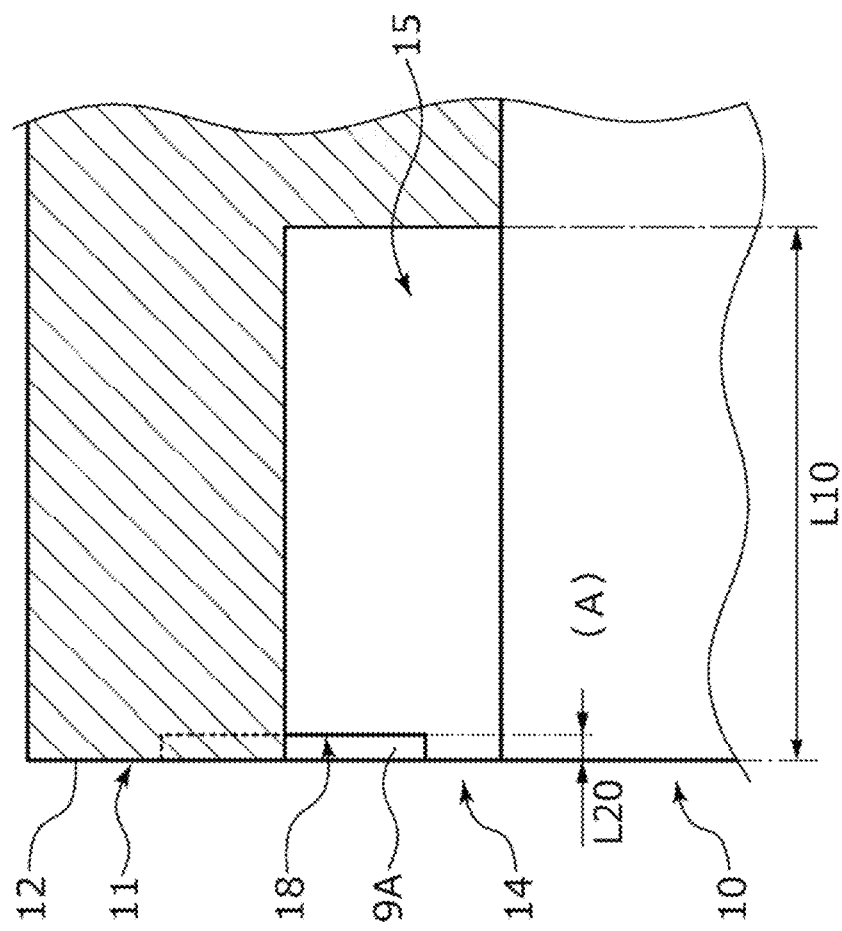

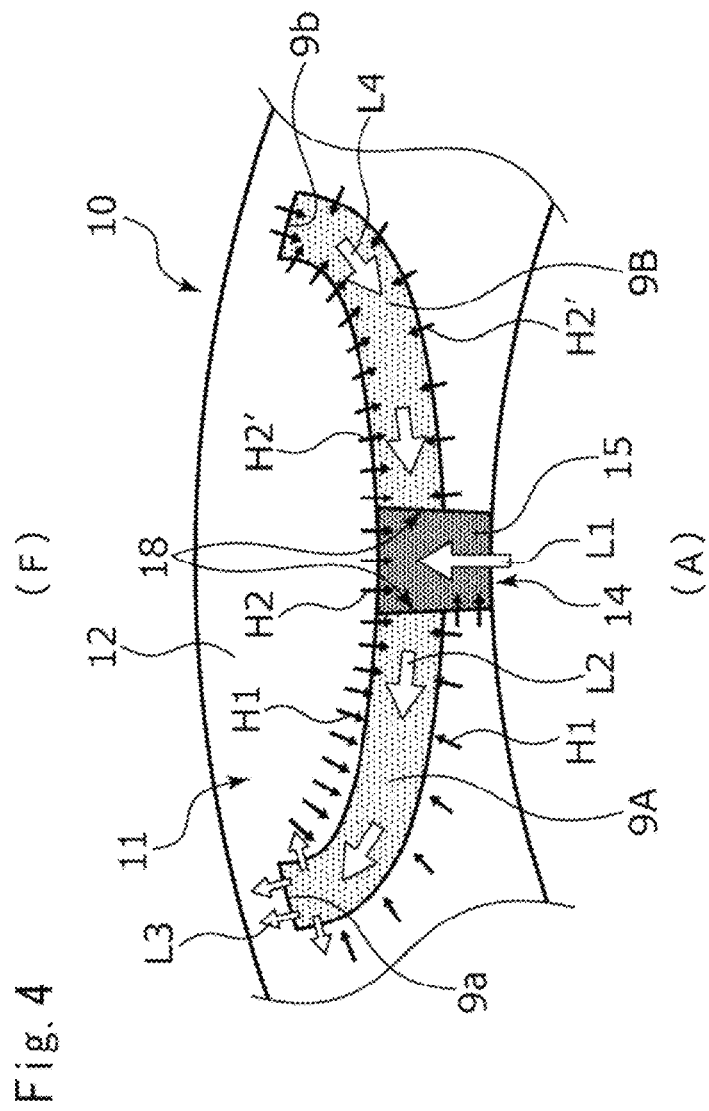

SLIDING COMPONENT

TECHNICAL FIELD

The present invention relates to sliding components that rotate relative to each other and are used for, for example, a shaft sealing device shaft-sealing a rotary shaft of a rotating machine in the automotive seal field, the general industrial machinery seal field, or another seal field or a bearing of a machine in the automotive bearing field, the general industrial machinery bearing field, or another bearing field.

BACKGROUND ART

A mechanical seal as an example of a shaft sealing device preventing sealing target liquid leakage includes a pair of annular sliding components rotating relative to each other and having sliding surfaces sliding with each other. In recent years and in such mechanical seals, it has been desired for environmental measures or the like to reduce the energy that is lost due to sliding, and the sliding surface of the sliding component is provided with a positive pressure generation groove that communicates with the outer diameter side as a high-pressure sealing target liquid side and is blocked at one end on the sliding surface. According to this, positive pressure is generated in the positive pressure generation groove and the sliding surfaces are separated from each other during the relative rotation of the sliding component. In addition, the sealing target liquid is introduced into the positive pressure generation groove from the outer diameter side and held. As a result, lubricity is improved and friction reduction is realized.

In addition, in the interest of long-term sealability, the mechanical seal requires conditions such as "sealing" in addition to "lubrication". For example, the mechanical seal illustrated in Patent Citation 1 is provided with a Rayleigh step and a reverse Rayleigh step communicating with the sealing target liquid side in one sliding component. According to this, during the relative rotation of the sliding component, the sliding surfaces are separated from each other by positive pressure being generated between the sliding surfaces by the Rayleigh step and lubricity is improved by the Rayleigh step holding the sealing target liquid. On the other hand, negative pressure is relatively generated in the reverse Rayleigh step and the reverse Rayleigh step is disposed on the leak side as compared with the Rayleigh step. Accordingly, the high-pressure sealing target liquid that has flowed out between the sliding surfaces from the Rayleigh step can be suctioned into the reverse Rayleigh step. In this manner, the sealing target liquid between the pair of sliding components is prevented from leaking to the leak side and sealability improvement is achieved.

CITATION LIST

Patent Literature

Patent Citation 1: WO 2012/046749 A (Pages 14 to 16, FIG. 1)

SUMMARY OF INVENTION

Technical Problem

However, in the structure of Patent Citation 1, the sealing target liquid is returned to the sealing target liquid side in the reverse Rayleigh step, and thus the sealing target liquid is not supplied to the leak side between the sliding surfaces and there may be a part that does not contribute to lubricity. As a result, there has been a demand for a sliding component with higher lubricity. In addition, the sealing target liquid that has flowed out between the sliding surfaces from the Rayleigh step is immediately suctioned into the reverse Rayleigh step disposed on the leak side as compared with the Rayleigh step and it was difficult to hold the sealing target liquid in quantity between the sliding surfaces.

The present invention has been made in view of such problems, and an object of the present invention is to provide a sliding component with which it is possible to exhibit high lubricity by supplying a sealing target fluid to the leak side between sliding surfaces, reduce the leakage of the sealing target fluid, and hold a large amount of the sealing target fluid between the sliding surfaces.

Solution to Problem

In order to solve the above problem, a sliding component according to the present invention is a sliding component formed in an annular shape and disposed at a relative rotation point of a rotating machine, wherein a plurality of dynamic pressure generation mechanisms are provided on a sliding surface of the sliding component, each of the dynamic pressure generation mechanisms including a first groove portion communicating with a leak side and a pair of second groove portions communicating with the first groove portion and extending on both sides in a circumferential direction, and an extension-direction end surface of each of the second groove portions is disposed on a sealing target fluid side as compared with a communication portion between the first groove portion and each of the second groove portions. According to the aforesaid feature of the present invention, the sealing target fluid supplied to the leak side of the sliding surface is recovered by the first groove portion communicating with the leak side, the recovered sealing target fluid is caused to flow out between the sliding surfaces from the second groove portions and partially returned to the sealing target fluid side in the radial direction, and thus a small amount of the sealing target fluid leaks to the leak side and lubricity improvement can be achieved in the wide area of the sliding surfaces. In addition, the second groove portions intersects with the relative rotation direction of the sliding component and extends to the sealing target fluid side, and thus the sealing target fluid is capable of flowing out from the end surface of the second groove portion on the downstream side to the sealing target fluid side between the sliding surfaces and it is possible to easily discharge the sealing target fluid flowing out between the sliding surfaces to the sealing target fluid side, suppress the sealing target fluid moving to the leak side, and hold a large amount of the sealing target fluid between the sliding surfaces.

It may be preferable that the first groove portion is formed deeper in dimension than the second groove portions. According to this preferable configuration, the first groove portion has a deep groove depth and a large volume, and thus a large amount of the sealing target fluid supplied to the leak side of the sliding surface can be recovered.

It may be preferable that each of the second groove portions curvedly extends so as to be convex toward the leak side. According to this preferable configuration, dynamic pressure can be smoothly generated in the second groove portions.

It may be preferable that the extension-direction end surface of each of the second groove portions is formed so as to face the sealing target fluid side. According to this preferable configuration, the sealing target fluid flows out from the end surface of the second groove portion toward the sealing target fluid side, and thus the sealing target fluid is easily discharged to the sealing target fluid side.

It may be preferable that a sealing target fluid-side end surface of the first groove portion is disposed along a sealing target fluid-side side surface of each of the second groove portions or on the leak side as compared with the sealing target fluid-side side surface of each of the second groove portions. According to this preferable configuration, it is possible to suppress the sealing target fluid on the sealing target fluid side as compared with the first groove portion between the sliding surfaces flowing into the first groove portion and efficiently recover the sealing target fluid supplied to the leak side of the sliding surface.

It may be preferable that the sliding surface of the sliding component is provided with a specific dynamic pressure generation mechanism disposed on the sealing target fluid side as compared with the dynamic pressure generation mechanisms and independent of the dynamic pressure generation mechanisms. According to this preferable configuration, it is possible to reduce sealing target fluid leakage to the leak side by means of the dynamic pressure generation mechanisms while generating an appropriate fluid film between the sliding surfaces by separating the sliding surfaces from each other by means of the specific dynamic pressure generation mechanism during the relative rotation of the sliding component.

It may be preferable that the first groove portion communicates with an inner diameter side of the sliding component. According to this preferable configuration, the sealing target fluid in the second groove portion can be returned to the sealing target fluid side by centrifugal force and the sealing target fluid is easily held in the first groove portion.

It should be noted that the fact that the second groove portion of the sliding component according to the present invention extends in the circumferential direction means that the second groove portion may extend such that at least a component along the circumferential direction increases and that the second groove portion may preferably extend along the circumferential direction rather than the radial direction. In addition, the fact that the first groove portion extends in the radial direction means that the first groove portion may extend with at least a component in the radial direction and that the first groove portion may preferably extend such that a component along the radial direction rather than the circumferential direction increases.

In addition, the sealing target fluid may be a liquid or a mist in which a liquid and a gas are mixed.

BRIEF DESCRIPTION OF DRAWINGS

FIG. 3 is a cross-sectional view taken along line A-A.

FIG. 4 is an enlarged view of a main part of the sliding surface of the stationary seal ring in the first embodiment.

DESCRIPTION OF EMBODIMENTS

Figure 1:
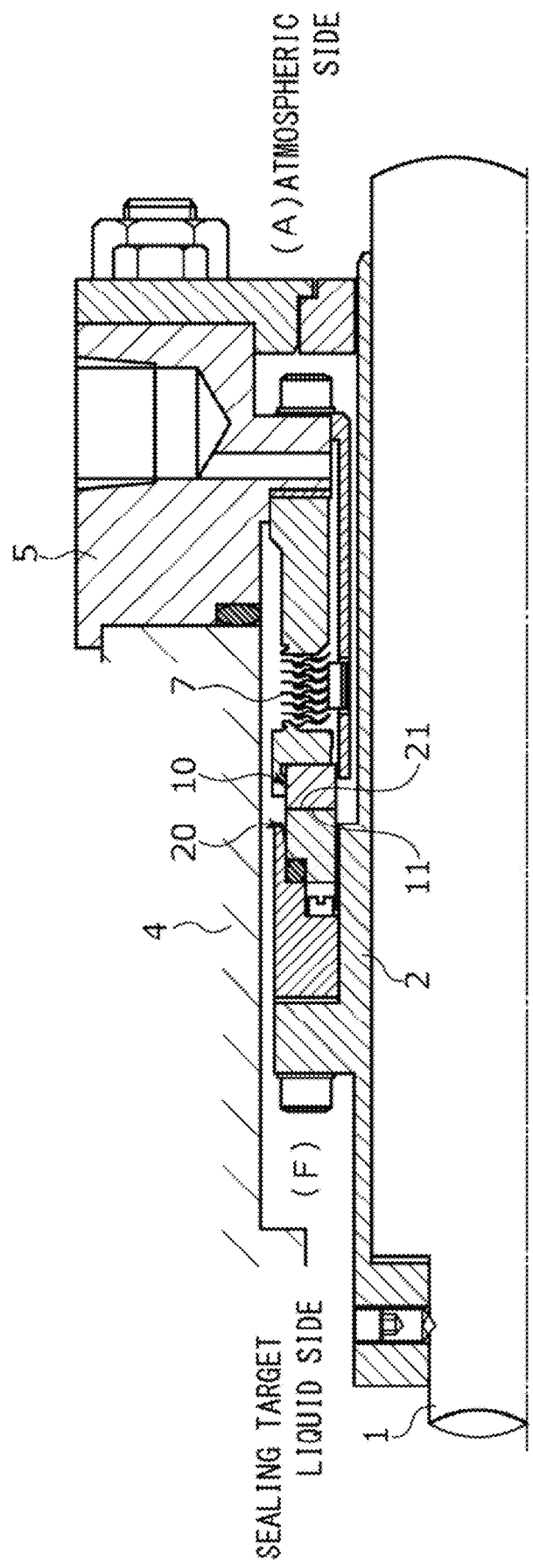
FIG. 1 is a vertical cross-sectional view illustrating an example of the mechanical seal including a sliding component according to a first embodiment of the present invention.

Modes for implementing the sliding component according to the present invention will be described below based on embodiments.

First Embodiment

The sliding component according to the first embodiment of the present invention will be described with reference to FIGS. 1 to 7. It should be noted that a mode in which the sliding component is a mechanical seal will be described as an example in the present embodiment. In addition, the outer diameter side of the sliding component constituting the mechanical seal is a sealing target liquid side (i.e., high-pressure side) and the inner diameter side is an atmospheric side (i.e., low-pressure side). In addition, for convenience of description, dots may be added to, for example, the grooves formed in the sliding surface in the drawings.

The mechanical seal for general industrial machine illustrated in FIG. 1 is an inside-type mechanical seal that seals a sealing target liquid F to leak from the outer diameter side toward the inner diameter side of a sliding surface. The mechanical seal mainly includes a rotating seal ring 20, which is an annular sliding component provided on a rotary shaft 1 in a state of being rotatable together with the rotary shaft 1 via a sleeve 2, and an annular stationary seal ring 10, which is a sliding component provided on a seal cover 5 fixed to a housing 4 of an attachment target device in a non-rotating state and a state of being movable in the axial direction. A sliding surface 11 of the stationary seal ring 10 and a sliding surface 21 of the rotating seal ring 20 slide closely with each other by a bellows 7 urging the stationary seal ring 10 in the axial direction. It should be noted that the sliding surface 21 of the rotating seal ring 20 is a flat surface and the flat surface is not provided with a recessed portion.

The stationary seal ring 10 and the rotating seal ring 20 are typically formed of a combination of SiC (as an example of hard material) or a combination of SiC (as the example of hard material) and carbon (as an example of soft material). However, the present invention is not limited thereto and any sliding material can be applied insofar as it is used as a sliding material for a mechanical seal. It should be noted that the SiC includes a sintered body using boron, aluminum, carbon, or the like as a sintering aid and a material made of two or more types of phases having different components and compositions, examples of which include SiC in which graphite particles are dispersed, reaction-sintered SiC made of SiC and Si, SiC—TiC, and SiC—TiN. As the carbon, resin-molded carbon, sintered carbon, and the like can be used, including carbon in which carbon and graphite are mixed. In addition to the above sliding materials, a metal material, a resin material, a surface modification material (coating material), a composite material, and the like can also be applied.

Figure 2:
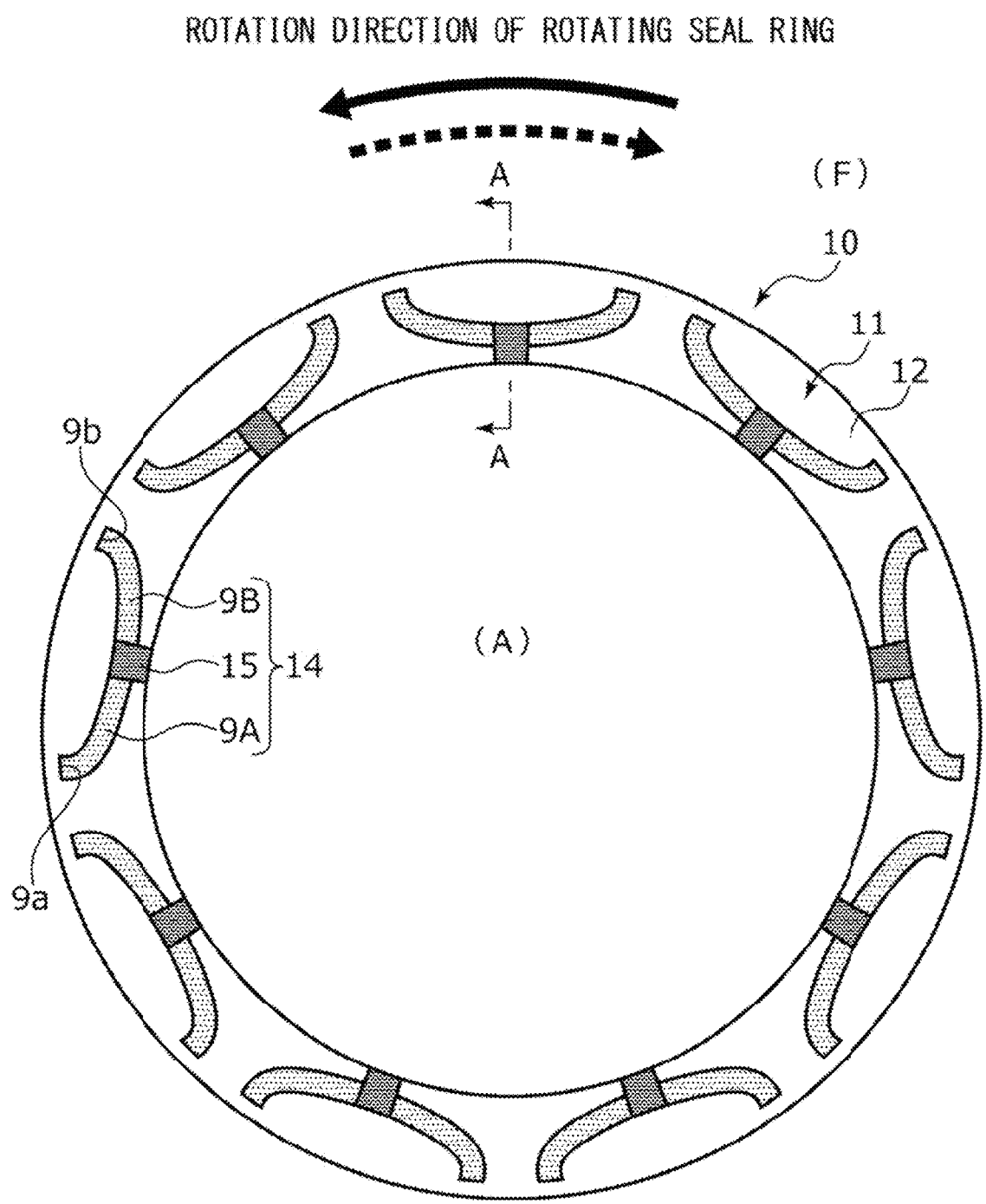
FIG. 2 is a diagram in which the sliding surface of a stationary seal ring is viewed from the axial direction in the first embodiment.

As illustrated in FIG. 2, the rotating seal ring 20 slides relative to the stationary seal ring 10 as indicated by the arrow and a plurality of dynamic pressure generation mechanisms 14 are evenly arranged in the circumferential direction of the stationary seal ring 10 on the sliding surface 11 of the stationary seal ring 10. The part of the sliding surface 11 other than the dynamic pressure generation mechanism 14 is a land 12 forming a flat surface.

Next, the dynamic pressure generation mechanism 14 will be outlined with reference to FIGS. 2 to 4. It should be noted that the left side of the page of FIG. 4 is the downstream side of the sealing target liquid F flowing in a Rayleigh step 9A (described later) and the right side of the page of FIG. 4 is the upstream side of the sealing target liquid F flowing in the Rayleigh step 9A in the following description, when the stationary seal ring 10 and the rotating seal ring 20 are relatively rotated.

The dynamic pressure generation mechanism 14 includes a liquid guide groove portion 15 as a first groove portion communicating with the atmospheric side and extending in the outer diameter direction, the Rayleigh step 9A as a second groove portion on the downstream side extending in an arc shape, that is, in the shape of a quarter of an elliptical arc toward the outer diameter side so as to be convex to the inner diameter side from the outer diameter-side end portion of the liquid guide groove portion 15, and a reverse Rayleigh step 9B as a second groove portion on the upstream side extending in an arc shape, that is, in the shape of a quarter of an elliptical arc toward the outer diameter side so as to be convex to the inner diameter side from the outer diameter-side end portion of the liquid guide groove portion 15. In other words, by the liquid guide groove portion 15, the Rayleigh step 9A, and the reverse Rayleigh step 9B, the dynamic pressure generation mechanism 14 has a Y shape when the sliding surface 11 is viewed from the orthogonal direction. It should be noted that the liquid guide groove portion 15 of the first embodiment extends in the radial direction so as to be orthogonal to the axis of the stationary seal ring 10. In addition, the liquid guide groove portion 15 communicates with the Rayleigh step 9A and the reverse Rayleigh step 9B and a depth-direction step 18 is formed at the communication part.

In addition, a wall portion 9a orthogonal to the rotation direction is formed in the downstream-side end portion of the Rayleigh step 9A. In addition, a wall portion 9b orthogonal to the rotation direction is formed in the upstream-side end portion of the reverse Rayleigh step 9B. It should be noted that the wall portions 9a and 9b are not limited to being orthogonal to the rotation direction and may be, for example, inclined with respect to the rotation direction or formed in a staircase shape.

In addition, a depth dimension L10 of the liquid guide groove portion 15 is deeper than a depth dimension L20 of the Rayleigh step 9A and the reverse Rayleigh step 9B (L10>L20). Specifically, the depth dimension L10 of the liquid guide groove portion 15 in the first embodiment is formed to be 100 μm and the depth dimension L20 of the Rayleigh step 9A and the reverse Rayleigh step 9B is formed to be 5 μm. In other words, the depth-direction step 18 is formed between the liquid guide groove portion 15 and the Rayleigh step 9A by the side surface of the liquid guide groove portion 15 on the downstream side and the bottom surface of the Rayleigh step 9A and the same step 18 is formed between the liquid guide groove portion 15 and the reverse Rayleigh step 9B. It should be noted that the depth dimensions of the liquid guide groove portion 15, the Rayleigh step 9A, and the reverse Rayleigh step 9B can be freely changed insofar as the depth dimension of the liquid guide groove portion 15 is formed deeper than the depth dimension of the Rayleigh step 9A and the reverse Rayleigh step 9B and it is preferable that the dimension L10 is at least five times the dimension L20.

It should be noted that the bottom surfaces of the Rayleigh step 9A and the reverse Rayleigh step 9B form a flat surface and are formed parallel to the land 12 and yet do not hinder the flat surface being provided with a fine recess or being formed so as to be inclined with respect to the land 12. Further, two circular arc-shaped surfaces of the Rayleigh step 9A and the reverse Rayleigh step 9B extending in the circumferential direction are orthogonal to the bottom surfaces of Rayleigh step 9A and reverse Rayleigh step 9B, respectively. In addition, although the bottom surface of the liquid guide groove portion 15 forms a flat surface and is formed parallel to the land 12, the bottom surface of the liquid guide groove portion 15 does not hinder the flat surface being provided with a fine recess or being formed so as to be inclined with respect to the land 12. Further, each of the two flat surfaces of the liquid guide groove portion 15 extending in the radial direction is orthogonal to the bottom surface of the liquid guide groove portion 15.

Next, the operation of the stationary seal ring 10 and the rotating seal ring 20 during the relative rotation will be described. First, during the non-operation of a general industrial machine and non-rotation of the rotating seal ring 20, capillarity causes the sealing target liquid F on the outer diameter side as compared with the sliding surfaces 11 and 21 to slightly enter between the sliding surfaces 11 and 21 and the dynamic pressure generation mechanism 14 is in a state where the sealing target liquid F remaining when the general industrial machine is stopped and the atmosphere that has entered from the inner diameter side as compared with the sliding surfaces 11 and 21 are mixed. It should be noted that the sealing target liquid F is higher in viscosity than a gas and thus the amount of leakage from the dynamic pressure generation mechanism 14 to the low-pressure side is small when the general industrial machine is stopped.

In a case where the rotating seal ring 20 rotates relative to the stationary seal ring 10 (see the black arrow in FIG. 2) with little sealing target liquid F remaining in the dynamic pressure generation mechanism 14 when the general industrial machine is stopped, a low pressure-side fluid A on the atmospheric side is introduced from the liquid guide groove portion 15 as indicated by an arrow L1 in FIG. 4 and the Rayleigh step 9A causes the low pressure-side fluid A to follow and move in the rotation direction of the rotating seal ring 20 as indicated by an arrow L2. This leads to dynamic pressure generation in the Rayleigh step 9A and, as a result, the low pressure-side fluid A in the reverse Rayleigh step 9B follows and moves in the rotation direction of the rotating seal ring 20 as indicated by an arrow L4.

The pressure is highest in the vicinity of the wall portion 9a, which is the downstream-side end portion of the Rayleigh step 9A, and the low pressure-side fluid A flows out from the vicinity of the wall portion 9a to the periphery as indicated by an arrow L3. It should be noted that the pressure gradually decreases toward the upstream side of Rayleigh step 9A.

In addition, during the relative rotation of the stationary seal ring 10 and the rotating seal ring 20, the high-pressure sealing target liquid F flows in between the sliding surfaces 11 and 21 from the outer diameter sides thereof at any time to result in so-called fluid lubrication. At this time, the pressure is high on the downstream side of the Rayleigh step 9A in particular as described above, and thus the sealing target liquid F in the vicinity of the Rayleigh step 9A remains positioned in the land 12 and hardly enters the Rayleigh step 9A as indicated by an arrow H1. On the other hand, the sealing target liquid F in the vicinity of the liquid guide groove portion 15 easily enters the liquid guide groove portion 15 as indicated by an arrow H2 as the liquid guide groove portion 15 is a deep groove portion and communicates with the low-pressure side. In addition, the sealing target liquid F is a liquid and has a large surface tension, and thus the sealing target liquid F easily moves along the side wall surface of the liquid guide groove portion 15 and enters the liquid guide groove portion 15. In addition, the sealing target liquid F in the vicinity of the reverse Rayleigh step 9B enters the reverse Rayleigh step 9B as indicated by an arrow H2' as a result of the movement of the low pressure-side fluid A indicated by the arrow L4 and then enters the liquid guide groove portion 15.

Next, the operation of the sealing target liquid F flowing out between the sliding surfaces 11 and 21 after suction into the liquid guide groove portion 15 will be described.

Figure 5A:
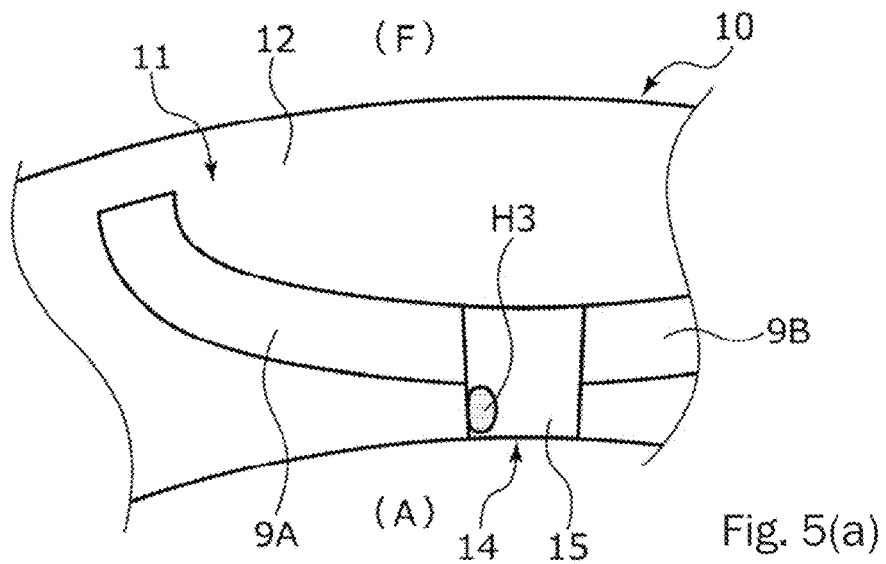
FIGS. 5A to 5C are schematic diagrams describing an operation in which a sealing target liquid suctioned from the inner diameter side of a liquid guide groove portion in the initial stage of relative rotation flows out between the sliding surfaces in the first embodiment.
Figure 5B:
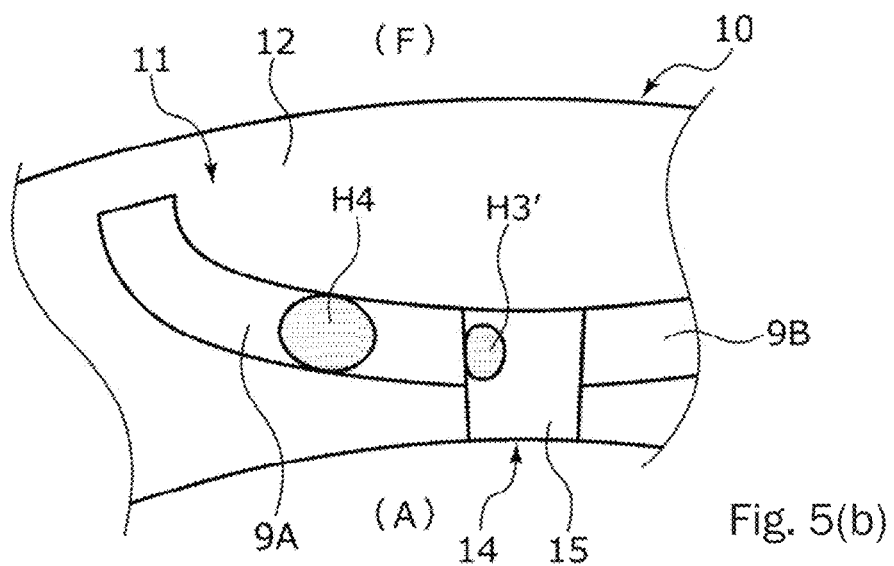

In a case where the rotating seal ring 20 rotates relative to the stationary seal ring 10 (see the black arrow in FIG. 2) with little sealing target liquid F remaining in the dynamic pressure generation mechanism 14, the sealing target liquid F that has entered the liquid guide groove portion 15 becomes a lump-shaped droplet as indicated by a reference numeral H3 in FIG. 5A. When the droplet subsequently reaches a certain volume, it is drawn into the Rayleigh step 9A, as indicated by a reference numeral H4 in FIG. 5B, by the relatively low pressure formed on the upstream side of the Rayleigh step 9A. At the same time, the sealing target liquid F newly enters the liquid guide groove portion 15 and becomes a droplet H3'. At this time, the amount of the sealing target liquid F entering the liquid guide groove portion 15 is larger than in the initial state of the relative rotation in FIG. 5A.

Figure 5C:
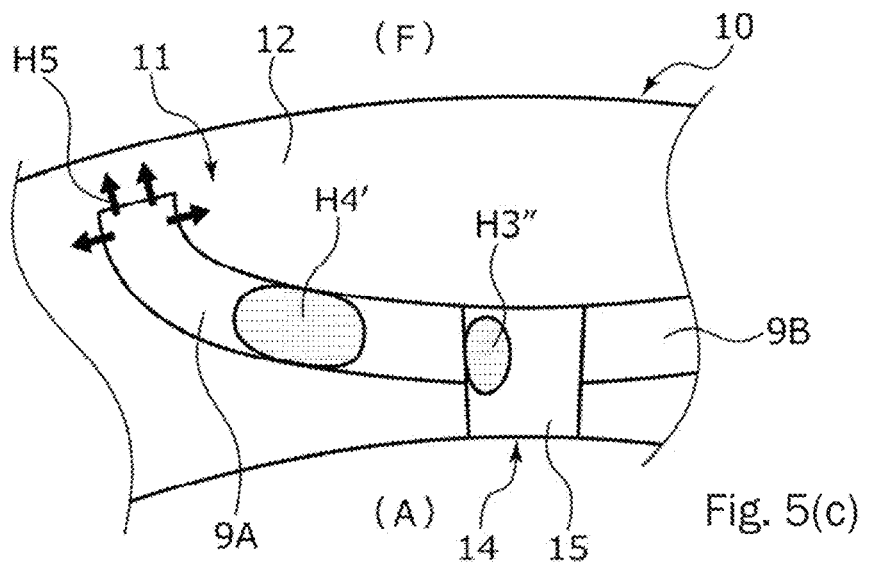

Subsequently, as illustrated in FIG. 5C, the sealing target liquid F drawn into the Rayleigh step 9A receives a large shearing force from the rotating seal ring 20, moves to the downstream side in the Rayleigh step 9A while increasing in pressure, and flows out to the vicinity of the wall portion 9a as indicated by an arrow H5. At the same time, a large amount of the sealing target liquid F newly enters the liquid guide groove portion 15 to become a droplet H3" and the droplet H3' is drawn into the Rayleigh step 9A as indicated by a reference numeral H4'.

Subsequently, the amount of the sealing target liquid F entering the liquid guide groove portion 15 becomes larger than in the state illustrated in FIG. 5C to result in a steady state where the sealing target liquid F continuously flows out between the sliding surfaces 11 and 21 from the Rayleigh step 9A. In the steady state, the high-pressure sealing target liquid F flows in between the sliding surfaces 11 and 21 from the outer diameter sides thereof and the Rayleigh step 9A at any time to result in fluid lubrication as described above. It should be noted that it takes a transient short time to reach the steady state through FIGS. 5A, 5B, and 5C. In addition, in a case where the sealing target liquid F remains in the dynamic pressure generation mechanism 14 when the general industrial machine is stopped, the operation is initiated from any of the state of FIG. 5A, the state of FIG. 5B, the state of FIG. 5C, and the steady state depending on the amount of the sealing target liquid F remaining in the dynamic pressure generation mechanism 14.

In addition, the interfacial tension with respect to a solid is larger in a liquid than in a gas, and thus the sealing target liquid F is easily held between the sliding surfaces 11 and 21 and the atmosphere is easily discharged to the inner diameter side as compared with the stationary seal ring 10 and the rotating seal ring 20.

Figure 6:
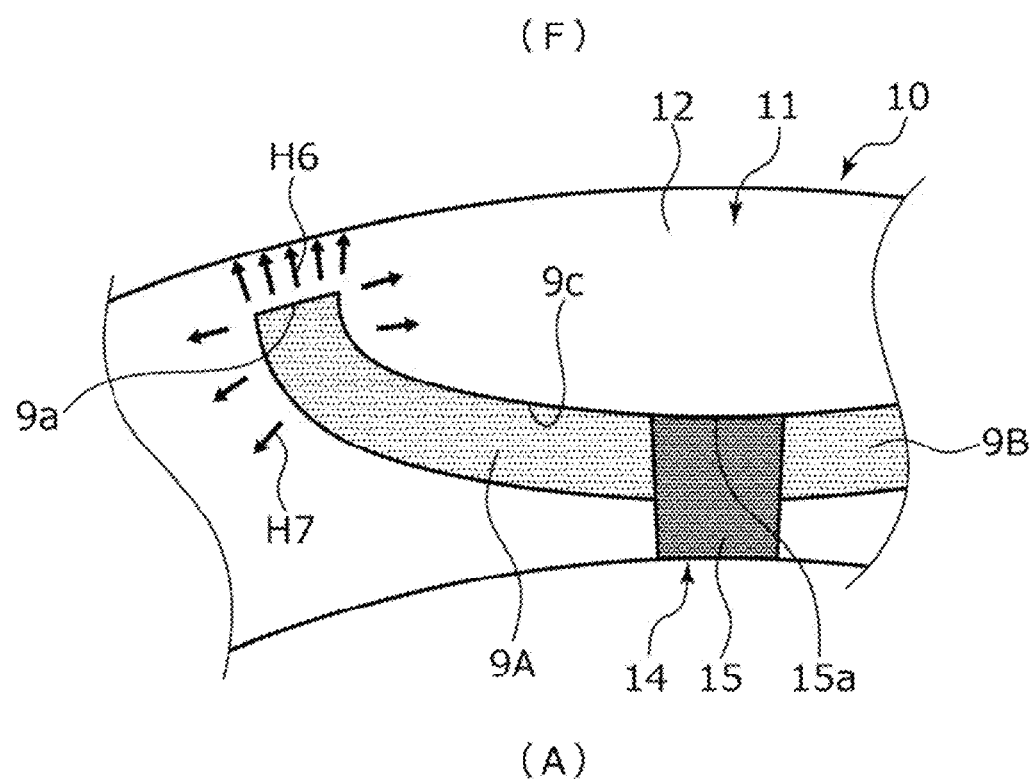
FIG. 6 is a schematic diagram illustrating a state where the sealing target liquid has flowed out between the sliding surfaces from the wall portion of a Rayleigh step in the first embodiment.

In addition, as illustrated in FIG. 6, the wall portion 9a constituting the end surface of the Rayleigh step 9A is formed along the circumferential direction so as to face the high-pressure side, most of the sealing target liquid F flowing out between the sliding surfaces 11 and 21 in the vicinity of the wall portion 9a flows out toward the high-pressure side as indicated by an arrow H6, and the amount of the sealing target liquid F flowing out toward the low-pressure side is small as indicated by an arrow H7.

As described above, during the relative rotation of the stationary seal ring 10 and the rotating seal ring 20, the dynamic pressure is generated in the Rayleigh step 9A by the sealing target liquid F that has entered the liquid guide groove portion 15 being drawn. Accordingly, the sealing target liquid F supplied to the low-pressure side between the sliding surfaces 11 and 21 is recovered by the liquid guide groove portion 15, the recovered sealing target liquid F is caused to flow out between the sliding surfaces 11 and 21 from the Rayleigh step 9A and partially returned to the high-pressure side in the radial direction, and thus a small amount of the sealing target liquid F leaks to the low-pressure side and lubricity improvement can be achieved in the wide area of the sliding surfaces 11 and 21.

In addition, the Rayleigh step 9A intersects with the relative rotation direction of the stationary seal ring 10 and the rotating seal ring 20 and extends to the high-pressure side, and thus the sealing target liquid F is capable of flowing out from the Rayleigh step 9A to the high-pressure side between the sliding surfaces 11 and 21 and it is possible to easily discharge the sealing target liquid F flowing out between the sliding surfaces 11 and 21 to the high-pressure side and suppress the sealing target liquid F moving to the low-pressure side. In other words, it is possible to reduce the amount of the sealing target liquid F drawn back into the Rayleigh step 9A after outflow between the sliding surfaces 11 and 21, and thus it is possible to hold a large amount of the sealing target liquid F between the sliding surfaces 11 and 21 while separating the sliding surfaces 11 and 21 from each other by the pressure generated by the Rayleigh step 9A and suppress a decrease in the amount of the sealing target liquid F drawn into the Rayleigh step 9A from the liquid guide groove portion 15.

In addition, the liquid guide groove portion 15 is deeper in groove depth and larger in volume than the Rayleigh step 9A, and thus a large amount of the sealing target liquid F supplied to the low-pressure side between the sliding surfaces 11 and 21 can be recovered. Further, a large amount of the sealing target liquid F is held in the liquid guide groove portion 15, and thus a sufficient amount of the sealing target liquid F drawn into the Rayleigh step 9A can be secured, the amount of the sealing target liquid F drawn into the Rayleigh step 9A can be substantially constant even when the amount of the sealing target liquid F held in the liquid guide groove portion 15 increases or decreases in a short time, and it is possible to avoid a poor lubrication of the sliding surfaces 11 and 21. In addition, the liquid guide groove portion 15 communicates with the low-pressure side, and thus the pressure in the liquid guide groove portion 15 is lower than the pressure of the sealing target liquid F between the sliding surfaces 11 and 21 and the sealing target liquid F in the vicinity of the liquid guide groove portion 15 is easily drawn into the liquid guide groove portion 15.

In addition, the Rayleigh step 9A is curved so as to be convex toward the low-pressure side and extends in a circular arc shape. Accordingly, the dynamic pressure generation in the Rayleigh step 9A can be smooth and the wall portion 9a of the Rayleigh step 9A can be disposed close to the high-pressure side. In addition, the wall portion 9a of the Rayleigh step 9A can be disposed so as to face the high-pressure side.

In addition, the wall portion 9a constituting the end surface of the Rayleigh step 9A is formed along the circumferential direction so as to face the high-pressure side, the sealing target liquid F flowing out between the sliding surfaces 11 and 21 in the vicinity of the wall portion 9a is discharged in quantity to the high-pressure side, and the movement of the sealing target liquid F to the low-pressure side is suppressed. Accordingly, a large amount of the sealing target liquid F can be held between the sliding surfaces 11 and 21 and it is possible to suppress a decrease in the amount of the sealing target liquid F drawn into the Rayleigh step 9A from the liquid guide groove portion 15.

In addition, the reverse Rayleigh step 9B has a shape symmetrical to the shape of the Rayleigh step 9A and the wall portion 9b of the reverse Rayleigh step 9B is formed along the circumferential direction so as to face the high-pressure side. In other words, the wall portion 9a of the Rayleigh step 9A and the wall portion 9b of the reverse Rayleigh step 9B do not face each other in the circumferential direction, and thus it is possible to avoid the circumferentially adjacent reverse Rayleigh step 9B immediately suctioning the sealing target liquid F flowing out between the sliding surfaces 11 and 21 from the Rayleigh step 9A and hold a large amount of the sealing target liquid F between the sliding surfaces 11 and 21.

In addition, referring to FIG. 6, a high pressure-side end surface 15a as the sealing target fluid-side end surface of the liquid guide groove portion 15 extends along a side surface 9c of the Rayleigh step 9A on the high-pressure side. Accordingly, it is possible to reduce the amount by which the sealing target liquid F on the high-pressure side as compared with the liquid guide groove portion 15 between the sliding surfaces 11 and 21 flows into the liquid guide groove portion 15 and efficiently perform the recovery by suppressing a decrease in the amount of the sealing target liquid F drawn into the liquid guide groove portion 15 from the inner diameter side as compared with the sliding surfaces 11 and 21. It should be noted that the high pressure-side end surface 15a of the liquid guide groove portion 15 may be disposed on the low-pressure side as compared with the side surface 9c of the Rayleigh step 9A on the high-pressure side.

In addition, the liquid guide groove portion 15 extends in the radial direction. Specifically, the liquid guide groove portion 15 extends in a direction orthogonal to the central axis of the stationary seal ring 10 and is disposed in the circumferential direction such that the Rayleigh step 9A intersects from the outer diameter-side end portion thereof.

Accordingly, the liquid guide groove portion 15 is unlikely to be affected by the dynamic pressure or the inertia of the flow of the sealing target liquid F generated in the Rayleigh step 9A. For this reason, the low pressure-side fluid A or the sealing target liquid F adhering to the inside surface of the stationary seal ring 10 is unlikely to be directly suctioned into the Rayleigh step 9A from the inner diameter side of the liquid guide groove portion 15. In addition, the sealing target liquid F can be held in the liquid guide groove portion 15 without being directly affected by the dynamic pressure.

It should be noted that the liquid guide groove portion 15 is not limited to the direction orthogonal to the central axis of the stationary seal ring 10 and may be inclined from a position orthogonal to the central axis of the stationary seal ring 10 and yet the inclination is preferably less than 45 degrees. Further, the shape of the liquid guide groove portion 15 can be freely changed into, for example, a circular arc shape.

In addition, the side surface of the liquid guide groove portion 15 on the downstream side and the bottom surface of the Rayleigh step 9A form the step 18 at the communication part between the Rayleigh step 9A and the liquid guide groove portion 15, and thus the sealing target liquid F can be held in the liquid guide groove portion 15 without being directly affected by the dynamic pressure.

In addition, the Rayleigh step 9A communicates with the liquid guide groove portion 15 over the entire width in the radial direction, and thus an opening region of the Rayleigh step 9A to the liquid guide groove portion 15 can be secured and the sealing target liquid F held in the liquid guide groove portion 15 can be efficiently suctioned up.

In addition, the liquid guide groove portion 15 communicates with the inner diameter side of the stationary seal ring 10. In other words, the sliding component is an inside-type mechanical seal and, during the relative rotation of the stationary seal ring 10 and the rotating seal ring 20, the sealing target liquid F in the Rayleigh step 9A can be returned to the high-pressure side by centrifugal force and the leakage of the sealing target liquid F to the low-pressure side on the inner diameter side as compared with the sliding surfaces 11 and 21 can be reduced.

In addition, the stationary seal ring 10 is provided with the dynamic pressure generation mechanism 14, and thus it is easy to keep the inside of the liquid guide groove portion 15 in a state close to the atmospheric pressure during the relative rotation of the stationary seal ring 10 and the rotating seal ring 20.

It should be noted that the rotating seal ring 20 may rotate relative to the stationary seal ring 10 in the clockwise direction of the page of FIG. 2 although the first embodiment exemplifies a mode in which the rotating seal ring 20 rotates relative to the stationary seal ring 10 in the counterclockwise direction of the page of FIG. 2. At this time, the low pressure-side fluid A moves in the order of the arrow L1, an arrow L2', and an arrow L3' and dynamic pressure generation occurs in the reverse Rayleigh step 9B (see FIG. 8). In other words, in a case where the rotating seal ring 20 rotates in the clockwise direction of the page of FIG. 2, the reverse Rayleigh step 9B functions as a Rayleigh step and the Rayleigh step 9A functions as a reverse Rayleigh step. In this manner, either the Rayleigh step 9A or the reverse Rayleigh step 9B can be used as the second groove portion for dynamic pressure generation, and thus use is possible regardless of the relative rotation direction of the stationary seal ring 10 and the rotating seal ring 20.

In addition, the liquid guide groove portion 15 and the Rayleigh step 9A may, for example, smoothly communicate without intersecting with each other and so as to form a straight line, a circular arc, or the like although the first embodiment exemplifies a mode in which the liquid guide groove portion 15, the Rayleigh step 9A, and the reverse Rayleigh step 9B form a Y shape when the sliding surface 11 is viewed from the orthogonal direction. In addition, although the Rayleigh step 9A and the reverse Rayleigh step 9B are formed symmetrically, the Rayleigh step 9A and the reverse Rayleigh step 9B may be equal or different in depth-dimension, circumferential length, and radial width.

In addition, the step 18 may not be provided at the communication part between the liquid guide groove portion 15 and the Rayleigh step 9A. For example, the liquid guide groove portion 15 and the Rayleigh step 9A may communicate with each other on an inclined surface. In this case, the part with a depth dimension of, for example, 5 μm or less can be the Rayleigh step 9A as the second groove portion and the part deeper than 5 μm can be the liquid guide groove portion 15 as the first groove portion.

In addition, although the first embodiment exemplifies a mode in which the liquid guide groove portion 15 as the first groove portion is formed deeper in dimension than the Rayleigh step 9A as the second groove portion, the first groove portion may be formed to have the same depth dimension as the second groove portion.

In addition, the Rayleigh step 9A and the reverse Rayleigh step 9B are not limited to the mode of being curved so as to be convex to the low-pressure side and extending in a circular arc shape. For example, the Rayleigh step 9A and the reverse Rayleigh step 9B may be curved so as to be convex to the high-pressure side and extend in a circular arc shape.

In addition, the wall portion 9a of the Rayleigh step 9A and the wall portion 9b of the reverse Rayleigh step 9B are not limited to facing the high-pressure side and may face the circumferential direction. In addition, the terminal ends of the Rayleigh step 9A and the reverse Rayleigh step 9B as the second groove portions may be tapered. In addition, at least a part of the end surface of the second groove portion may meander and extend from the first groove portion insofar as it is disposed on the high-pressure side.

Figure 7:
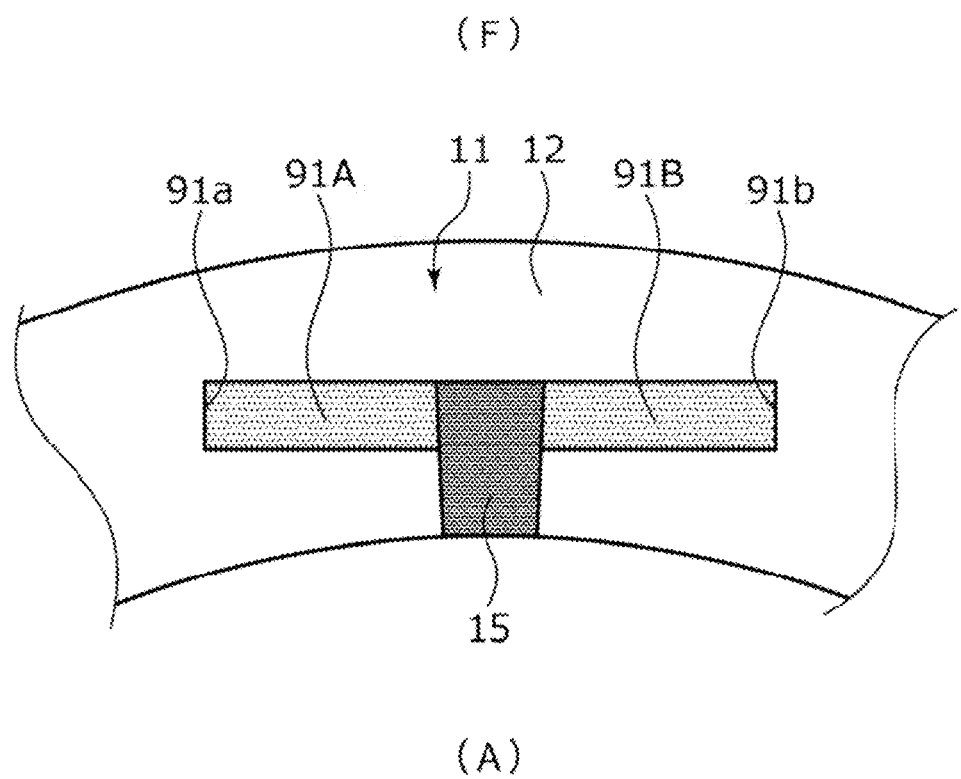
FIG. 7 is an explanatory diagram illustrating a first modification example of the present invention.

Next, a modification example of the second groove portion will be described. As illustrated in FIG. 7, a Rayleigh step 91A and a reverse Rayleigh step 91B as the second groove portions of a first modification example linearly extend so as to be orthogonal to the liquid guide groove portion 15. Specifically, at least a part of a wall portion 91a of the Rayleigh step 91A and a wall portion 91b of the reverse Rayleigh step 91B is disposed on the high-pressure side when viewed from the circumferential direction. With such a shape, the sealing target liquid F flowing out between the sliding surfaces 11 and 21 can be easily discharged to the high-pressure side.

Second Embodiment

Next, the sliding component according to the second embodiment of the present invention will be described with reference to FIG. 8. It should be noted that configurations identical to those of the first embodiment will not be described below so that redundancy can be avoided.

Figure 8:
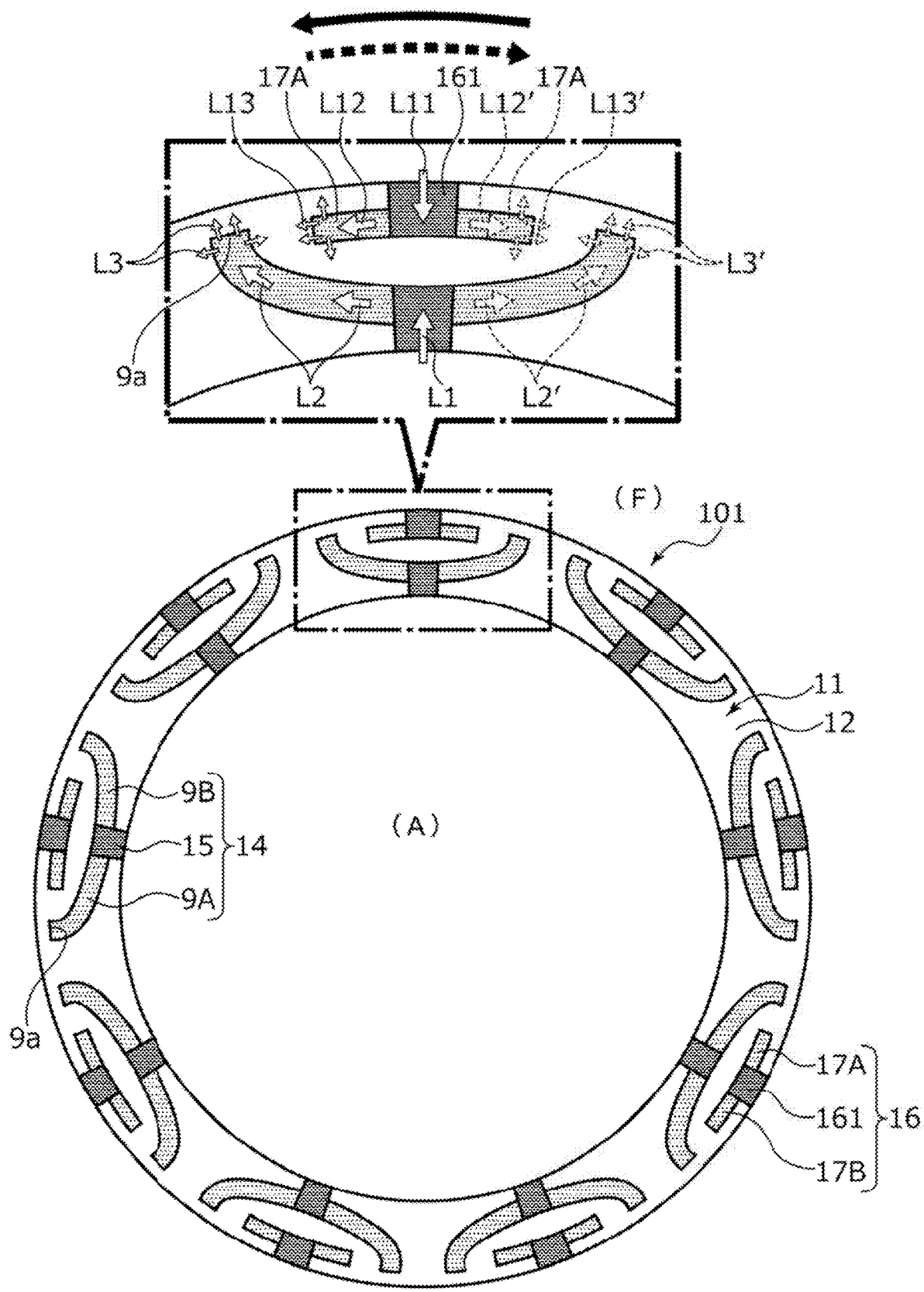
FIG. 8 is a diagram in which the sliding surface of the stationary seal ring as a sliding component according to a second embodiment of the present invention is viewed from the axial direction.

As illustrated in FIG. 8, the plurality of dynamic pressure generation mechanisms 14 and a plurality of specific dynamic pressure generation mechanisms 16 are formed in a stationary seal ring 101. The specific dynamic pressure generation mechanism 16 includes a liquid guide groove portion 161 communicating with the high-pressure side, a Rayleigh step 17A circumferentially extending concentrically with the stationary seal ring 101 toward the downstream side from the inner diameter-side end portion of the liquid guide groove portion 161, and a reverse Rayleigh step 17B circumferentially extending concentrically with the stationary seal ring 101 toward the upstream side from the inner diameter-side end portion of the liquid guide groove portion 161. The liquid guide groove portion 161 and the liquid guide groove portion 15 are formed at circumferentially corresponding positions. In addition, the liquid guide groove portion 161 functions as the first groove portion of the specific dynamic pressure generation mechanism 16 and the Rayleigh step 17A and the reverse Rayleigh step 17B function as the second groove portions of the specific dynamic pressure generation mechanism 16.

The Rayleigh step 9A and the reverse Rayleigh step 9B of the dynamic pressure generation mechanism 14 are formed longer in the circumferential direction than the Rayleigh step 17A and the reverse Rayleigh step 17B of the specific dynamic pressure generation mechanism 16. In addition, the depth dimension of the Rayleigh step 17A and the reverse Rayleigh step 17B is formed to be 5 μm as in the case of the Rayleigh step 9A and the reverse Rayleigh step 9B. In addition, the radial width of the Rayleigh step 17A and the reverse Rayleigh step 17B is formed smaller than the radial width of the Rayleigh step 9A and the reverse Rayleigh step 9B. In other words, the volume of a dynamic pressure generation mechanism 141 is larger than the volume of the specific dynamic pressure generation mechanism 16.

In a case where the rotating seal ring 20 rotates in the counterclockwise direction of the page indicated by the solid-line arrow in FIG. 8, the sealing target liquid F moves in the order of arrows L11, L12, and L13 and dynamic pressure generation occurs in the Rayleigh step 17A. In addition, in a case where the rotating seal ring 20 rotates in the clockwise direction of the page indicated by the dotted-line arrow in FIG. 8, the sealing target liquid F moves in the order of the arrow L11, an arrow L12', and an arrow L13' and dynamic pressure generation occurs in the reverse Rayleigh step 17B. In this manner, the dynamic pressure can be generated in the specific dynamic pressure generation mechanism 16 regardless of the relative rotation direction of the stationary seal ring 101 and the rotating seal ring 20.

In addition, it is possible to recover the sealing target liquid F to leak from the sliding surface 11 to the low-pressure side by means of the dynamic pressure generation mechanism 14 while generating an appropriate liquid film by separating the sliding surfaces 11 and 21 from each other by means of the dynamic pressure generated by the specific dynamic pressure generation mechanism 16.

In addition, since the volume of the dynamic pressure generation mechanism 14 is larger than the volume of the specific dynamic pressure generation mechanism 16, it is possible to adjust the dynamic pressure balance between the dynamic pressure generation mechanism 14 on the low-pressure side and the specific dynamic pressure generation mechanism 16 on the high-pressure side by increasing the suction force of the Rayleigh step 9A and the reverse Rayleigh step 9B of the dynamic pressure generation mechanism 14.

In addition, the wall portion 9a, which is the terminal end of the dynamic pressure generation mechanism 14, and a wall portion 17a, which is the terminal end of the specific dynamic pressure generation mechanism 16, are misaligned in the circumferential direction, and thus pressure dispersion is possible in the circumferential direction of the sliding surfaces 11 and 21 and the balance is satisfactory.

It should be noted that the Rayleigh step 9A and the reverse Rayleigh step 9B may be equal in circumferential length to the Rayleigh step 17A and the reverse Rayleigh step 17B or shorter in circumferential length than the Rayleigh step 17A and the reverse Rayleigh step 17B. In addition, the Rayleigh step 17A and the reverse Rayleigh step 17B may be different in depth-dimension from the Rayleigh step 9A and the reverse Rayleigh step 9B. In addition, the Rayleigh step 17A and the reverse Rayleigh step 17B may be larger in radial width than the Rayleigh step 9A and the reverse Rayleigh step 9B. Preferably, the dynamic pressure generation mechanism 141 may be larger in volume than the specific dynamic pressure generation mechanism 16.

Third Embodiment

Next, the sliding component according to the third embodiment will be described with reference to FIG. 9. It should be noted that configurations identical to those of the second embodiment will not be described below so that redundancy can be avoided.

Figure 9:
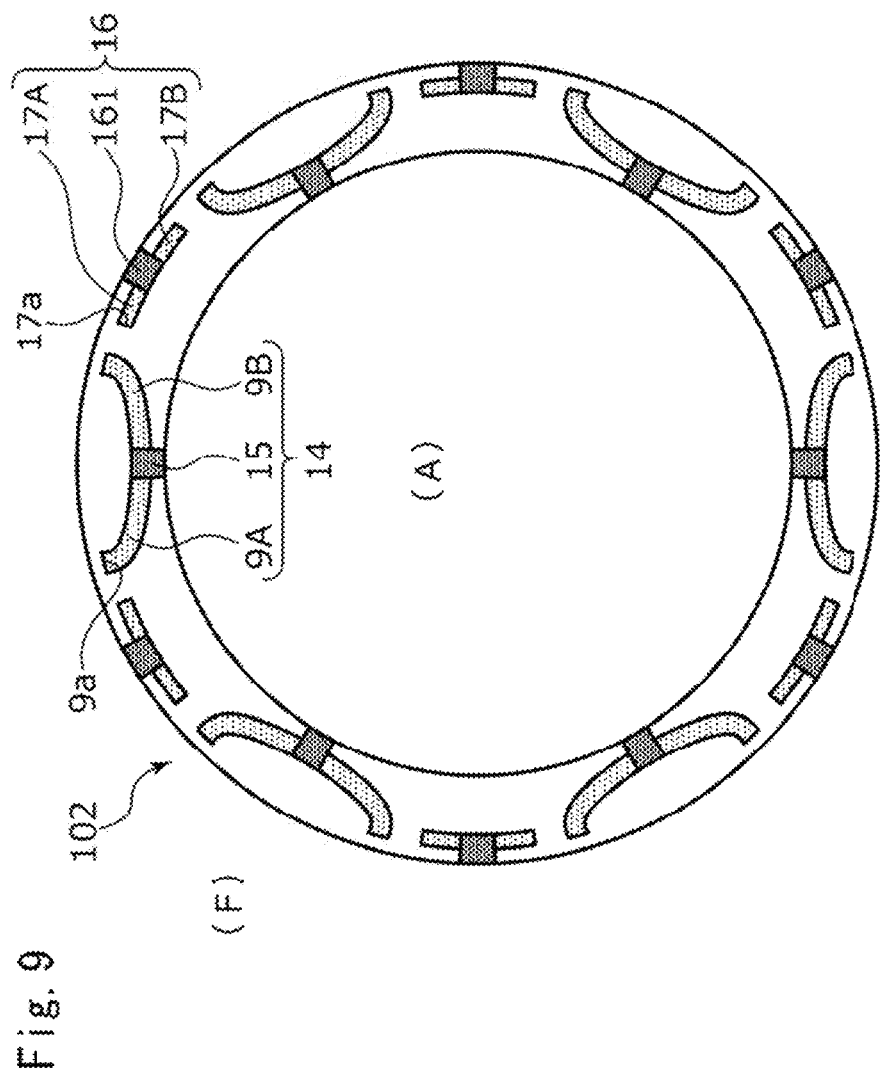
FIG. 9 is a diagram in which the sliding surface of the stationary seal ring as a sliding component according to a third embodiment of the present invention is viewed from the axial direction.

As illustrated in FIG. 9, a stationary seal ring 102 is arranged so as to be circumferentially misaligned from the dynamic pressure generation mechanism 14 such that the specific dynamic pressure generation mechanism 16 is positioned between the adjacent dynamic pressure generation mechanisms 14. According to this, the wall portion 9a, which is the terminal end of the dynamic pressure generation mechanism 14, and the wall portion 17a, which is the terminal end of the specific dynamic pressure generation mechanism 16, are misaligned in the circumferential direction, and thus pressure dispersion is possible in the circumferential direction of the sliding surfaces 11 and 21 and the balance is satisfactory. It should be noted that the specific dynamic pressure generation mechanism 16 may be disposed in a radially overlapping manner so as to circumferentially straddle the adjacent dynamic pressure generation mechanism 14.

Fourth Embodiment

Next, the sliding component according to the fourth embodiment of the present invention will be described with reference to FIG. 10. It should be noted that configurations identical to those of the first embodiment will not be described below so that redundancy can be avoided.

Figure 10:
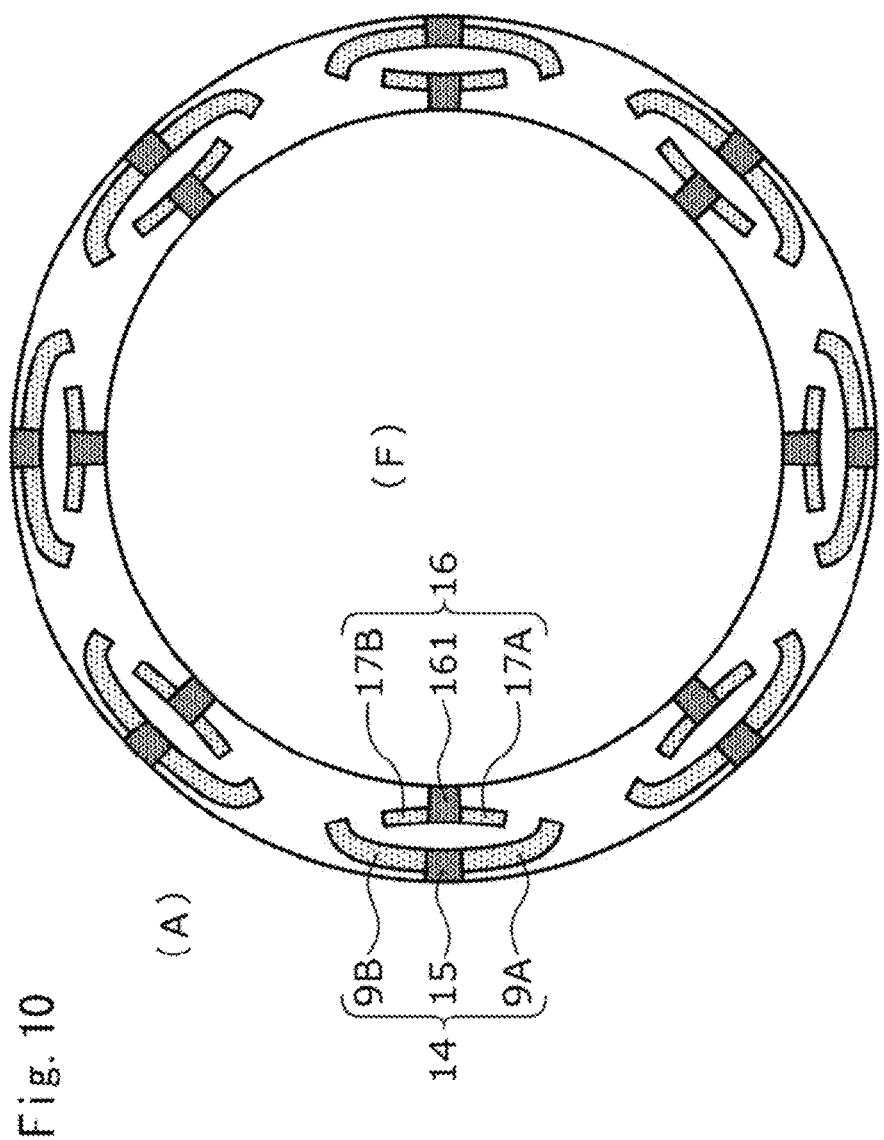
FIG. 10 is a diagram in which the sliding surface of the stationary seal ring as a sliding component according to a fourth embodiment of the present invention is viewed from the axial direction.

The mechanical seal illustrated in FIG. 10 is an outside-type mechanical seal that seals the sealing target liquid F to leak from the inner diameter side toward the outer diameter side of a sliding surface. The dynamic pressure generation mechanism 14 is disposed on the outer diameter side so as to communicate with the low-pressure side, and the specific dynamic pressure generation mechanism 16 is disposed on the inner diameter side so as to communicate with the high-pressure side. It should be noted that the dynamic pressure generation mechanism in the outside-type mechanical seal may be formed in an inverted L shape or an L shape corresponding to one rotation as in the first embodiment and the modification example of the dynamic pressure generation mechanism illustrated in FIG. 7 or the like may be applied. In addition, the specific dynamic pressure generation mechanism may be absent as in the first embodiment or the specific dynamic pressure generation mechanism may be formed as in FIG. 8 or FIG. 11 (described later).

Figure 11A:
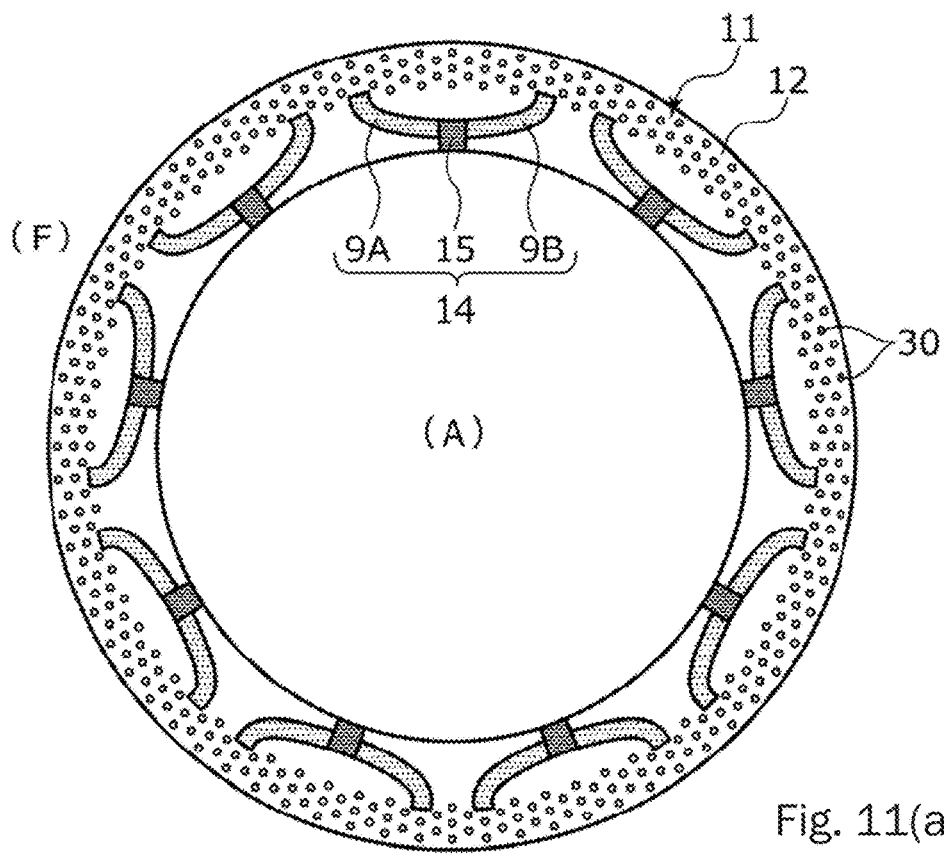
FIG. 11A is an explanatory diagram illustrating a second modification example of the present invention.

Next, a modification example of the specific dynamic pressure generation mechanism will be described. As illustrated in FIG. 11A, the specific dynamic pressure generation mechanism of a second modification example is concave dimples 30 having a circular shape when the sliding surface 11 is viewed from the orthogonal direction. It should be noted that the shape, quantity, disposition, and so on of the dimples 30 can be freely changed.

Figure 11B:
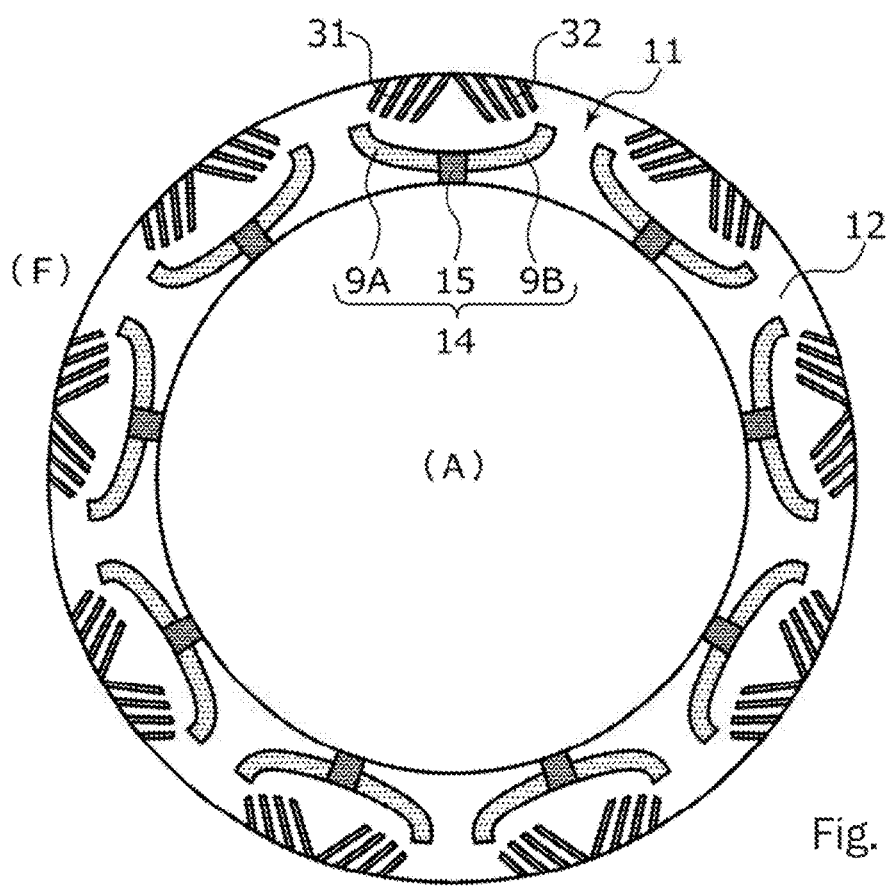
FIG. 11B is an explanatory diagram illustrating a third modification example of the present invention.

In addition, as illustrated in FIG. 11B, the specific dynamic pressure generation mechanism of the second modification example is circular arc grooves 31 and 32 extending in a circular arc shape while being inclined toward the radial direction. Specifically, the outer diameter-side end portions of the circular arc grooves 31 and 32 communicate with the high-pressure side, the plurality of circular arc grooves 31 are arranged on the outer diameter side of the Rayleigh step 9A, and the plurality of circular arc grooves 32 are arranged on the outer diameter side of the reverse Rayleigh step 9B.

In addition, the circular arc groove 31 has a shape in which the sealing target liquid F moves toward the inner diameter side when the rotating seal ring 20 rotates in the counterclockwise direction of the page of FIG. 11B and the circular arc groove 32 has a shape in which the sealing target liquid F moves toward the inner diameter side when the rotating seal ring 20 rotates in the clockwise direction of the page of FIG. 11B. The pressure on the inner diameter side of the circular arc groove 31 increases when the rotating seal ring 20 rotates counterclockwise, the pressure on the inner diameter side of the circular arc groove 32 increases when the rotating seal ring 20 rotates clockwise, and thus it is possible to generate an appropriate liquid film by separating the sliding surfaces 11 and 21 from each other. It should be noted that the shape, quantity, disposition, and so on of each of the circular arc grooves 31 and 32 can be freely changed.

Although embodiments of the present invention have been described above with reference to the drawings, the specific configuration is not limited to the embodiments and any change or addition within the scope of the scope of the present invention is included in the present invention.

For example, although the mechanical seal for general industrial machine has been described as an example of the sliding component in the above embodiments, the mechanical seal may be replaced with another mechanical seal for an automobile, a water pump, or the like. In addition, the present invention is not limited to the mechanical seal and may be a sliding component other than a mechanical seal, examples of which include a slide bearing.

In addition, although an example in which the dynamic pressure generation mechanism is provided only on the stationary seal ring has been described in the above embodiment, the dynamic pressure generation mechanism may be provided only on the rotating seal ring 20 or on both the stationary and rotating seal rings.

In addition, although a mode in which the sliding component is provided with a plurality of dynamic pressure generation mechanisms having the same shape has been exemplified in the above embodiment, a plurality of dynamic pressure generation mechanisms having different shapes may be provided. In addition, the interval, quantity, and so on of the dynamic pressure generation mechanisms can be changed as appropriate.

In addition, although the sealing target fluid side is the high-pressure side and the leak side is the low-pressure side in the description, the sealing target fluid side may be the low-pressure side and the leak side may be the high-pressure side. The pressure on the sealing target fluid side and the pressure on the leak side may be substantially the same.

REFERENCE SIGNS LIST

9A Rayleigh step (second groove portion)
9B Reverse Rayleigh step (second groove portion)
9a Wall portion (end surface)
9b Wall portion (end surface)
10 Stationary seal ring (sliding component)
11 Sliding surface
14 Dynamic pressure generation mechanism
15 Liquid guide groove portion (first groove portion)
15a End surface (sealing target fluid-side end surface)
16 Specific dynamic pressure generation mechanism
20 Rotating seal ring (sliding component)
21 Sliding surface

The invention claimed is:

1. A pair of sliding components formed in an annular shape and disposed at a relative rotation point of a rotating machine and between a high-pressure space side and a low-pressure space side which are generated inside the rotating machine by operation of the rotating machine, the high-pressure space side space being lower than the low-pressure side in pressure, wherein
the high-pressure space side is one of an inner diameter space side and an outer diameter space side of the sliding components,
the low-pressure space side is remaining one of the inner diameter space side and the outer diameter space side,
a plurality of dynamic pressure generation mechanisms are provided on a sliding surface of one of the sliding components, each of the dynamic pressure generation mechanisms including a first groove portion communicating with the low-pressure space side and extending in a radial direction to have a terminal end on the high-pressure space side, and a pair of second groove portions communicating with the terminal end of the first groove portion and extending on both sides in a circumferential direction, wherein the first groove portion is formed deeper in dimension than the second groove portions,
wherein each of the second groove portions curvedly extends so as to be convex toward the low-pressure space side,
wherein each of the second groove portions has a first side wall surface extending from the first groove portion on the high-pressure space side and spaced apart from an outer diameter of the sliding component, a second side wall surface extending from the first groove portion on the low-pressure space side and spaced away from an inner diameter of the sliding component, and an end wall surface connecting the first side wall surface and the second side wall surface in an end of the second end groove,
wherein the end wall surface of each of the second groove portions is disposed on the high-pressure space side as compared with a communication portion between the first groove portion and each of the second groove portions,
wherein the end wall surface of the second groove portion is a surface extending in the circumferential direction, and
wherein the first groove portion has a pair of side wall surfaces each linearly extending, in a direction in a parallel to a radially extending direction of the first groove portion, from a low-pressure space side edge of the first groove portion to a location at which the side wall surfaces of the first groove portion and the first and second side wall surfaces of the second groove portions intersect one another.

2. The pair of sliding components according to claim 1, wherein a high-pressure space side end surface of the first groove portion is disposed along the first side wall surface of each of the second groove portions or on the low-pressure space side as compared with the first side wall surface of each of the second groove portions.

3. The pair of sliding components according to claim 1, wherein the sliding surface of the sliding component is provided with a specific dynamic pressure generation mechanism disposed on the high-pressure space side as compared with the dynamic pressure generation mechanisms and independent of the dynamic pressure generation mechanisms.

4. The pair of sliding components according to claim 1, wherein the first groove portion communicates with an inner diameter side of the sliding component.

5. The pair of sliding components according to claim 2, wherein the sliding surface of the sliding component is provided with a specific dynamic pressure generation mechanism disposed on the sealing target fluid side as compared with the dynamic pressure generation mechanisms and independent of the dynamic pressure generation mechanisms.

6. The pair of sliding components according to claim 1, wherein a Rayleigh step is formed at an intersection of the bottom surface of the first groove portion and one of the pair of second groove portions, and a reverse Rayleigh step is formed at an intersection of the bottom surface of the first groove portion and the other of the pair of second groove portions.

7. The pair of sliding components according to claim 1, wherein the side wall surfaces of the first groove portion extend orthogonally to a bottom surface of the first groove portion.

* * * * *